United States Patent [19]
Furuta et al.

[11] Patent Number: 5,655,051
[45] Date of Patent: Aug. 5, 1997

[54] DIGITAL SIGNAL REPRODUCING APPARATUS

[75] Inventors: Noriaki Furuta, Otsu; Kouji Shimazu, Neyagawa; Satoshi Endo, Katano; Noriyuki Sakamoto, Hirakata, all of Japan

[73] Assignee: Matsushita Electric Industrial Co., Ltd., Kadoma, Japan

[21] Appl. No.: 411,529

[22] Filed: Mar. 28, 1995

[30]    Foreign Application Priority Data

Mar. 28, 1994  [JP]  Japan .................... 6-057331

[51] Int. Cl.$^6$ .................... H04N 5/91; G11B 15/18
[52] U.S. Cl. .................... 386/105; 386/106; 386/69; 360/72.2
[58] Field of Search .................... 360/69, 72.1, 72.2, 360/18; 358/342, 335, 341, 343, 310, 907

[56]              References Cited

U.S. PATENT DOCUMENTS 4,890,171  12/1989  Nagao .................... 360/73.05
5,218,450  6/1993  Nagai et al. .................... 358/335

*Primary Examiner*—Andrew Faile
*Assistant Examiner*—Robert Chevalier
*Attorney, Agent, or Firm*—Ratner & Prestia

[57]              ABSTRACT

A digital signal reproducing apparatus capable of reproducing video and audio information from a compact disk without losing the beginning of the video and audio information even when reproducing disks wherein the video and audio information are recorded simultaneously from the first block of any specified selection, said apparatus includes a reproduction position detector for outputting the current reproduction position based on the subcode information. An offset reproducer offsets the disk track being reproduced to a track position before the current reproduction position after accessing the specified reproduction position, then resuming reproduction. First and second shift controllers outputs first and second shift position information obtained by adding or subtracting a constant value to the access position information when initial access is completed. A digital muting canceler cancels audio muting when the reproduction position passes the first shift position; and a video muting canceler cancels video muting when the reproduction position passes said second shift position.

3 Claims, 13 Drawing Sheets

DIGITAL SIGNAL REPRODUCING APPARATUS

BACKGROUND OF THE INVENTION

1. Field of the Invention

The present invention relates to a digital signal reproducing apparatus for reproducing digital signals from a recording medium wherein each data block separately stores plural kinds of playback source signals in discrete areas thereof and, more particularly, to a digital signal reproducing apparatus for reproducing audio signals and video signals from compact disks to which are recorded still images using the CD-G (compact disk graphic) format, video CDs to which are recorded moving picture video sequences, and other types of similar digital disks.

2. Description of the Prior Art

A variety of standards have been established for the optical recording and reproducing medium such as a compact disk which is referred to as "CD" in recent years, and while the first CD players were audio-only reproducing devices, some types of CD players today can also reproduce motion video sequences with simultaneous audio accompaniment. One format and reproducing apparatus of this type is the CD-G (CD graphics) karaoke player for reproducing the still image data and the audio stored in the optical disks to displaying the lyrics and/or other still image on a television or other display device and to output the audio information through speakers.

In FIG. 11, a block diagram of an example of conventional digital reproducing apparatus for the playback of a CD-G disk or similar disk-shaped recording medium 1 is shown. A CD-graphic disk is an optically recorded digital disk to which is recorded both audio information and still image (graphic) information be reproduced, and is referred to as "disk" hereafter. According to the use's selection input to the apparatus, a controller 3 controls the operation thereof so that a signal reader 4 reproduces the digital data Sf stored in the specified area of the disk 1 to produce an audio information data Sa and a video information data Sr. The video information data Sr is also a sub-code signal containing the time code information and still image information.

A subcode extractor 6 extracts a subcode information Sc and a video information Sv from the data Sr which are transferred to a digital mute 17 and a video information mute 25, respectively. The digital mute 17 digitally mutes the digital audio data Sa and passes the muted data, or cancels muting and passes the non-muted data to a D/A converter 18 whereat those muted or non-muted digital audio data is converted to analog audio signal. An analog mute 19 mutes and passes the analog audio data from the D/A converter 18, or cancels muting and passes the non-muted signal to an amplifier 20 whereby the audio signal is amplified at a constant amplification factor. Thus power amplified audio signal is applied to a speaker 21 for converting to sound waves.

The video information mute 25 digitally mutes the digital video data Sv and passes the muted data, or cancels muting and passes the nun-muted data to an image data composer 26. The image data composer 26 composes and stores to a temporary video storage memory the image data required for video display based on the digital video data signal output from the video information mute 25. The image data generated by the image data composer 26 is displayed on a television or other video display means 28.

A reproduction position detector 7 detects the current reproduction position of the disk 1 from the sub-code information Sc. An access controller 5 drives the controller 3 to access the desired reproduction position of the disk 1. An address storage 8 stores the disk address output from the reproduction position detector 7 when access by the access controller 5 is completed. When access by the access controller 5 is completed, the analog muting canceler 16 cancels the muting applied by the analog mute 19. The address comparator 10 compares the value of the output from the address storage 8 with that from the reproduction position detector 7 to produce an address comparison signal Sp.

When access by the access controller 5 is completed, the pause controller 9 pauses at that address for a predetermined period based on the address comparison signal Sp. When the predetermined pause imposed by the pause controller 9 is completed, the re-access controller 11 re-accesses the reproduction position of the disk 1 stored in the address storage 8. A reproducer 29 produces a reproduction command signal Sd so as to begin reproducing the disk when the access operation executed by the re-access controller 11 is confirmed completed based on the output from the address comparator 10.

After re-access is completed and it is confirmed based on the output of the address comparator 10 that the reproducer 29 has passed the reproduction position stored in the address storage 8, a digital muting canceler 15 produces a digital muting cancelling signal Sac to cancel muting by the digital mute 17. After the transition to the reproduction operation of the reproducer 29 is completed, and the reproduction position stored in the address storage 8 is detected to have been passed based on the output from the address comparator 10, a video muting canceler 24 produces video mute canceling signal Svc to cancel muting by a video information mute 25.

Note that the components contained within the dotted line in FIG. 11 are typically comprised within a microcomputer 27, which with the appropriate software achieves and controls the major functions of the digital signal reproducing apparatus.

The specific operation of this conventional digital signal reproducing apparatus of FIG. 11 when reproducing a CD-G type disk is described below with reference to FIGS. 12 and 13. In FIG. 12, a flow chart of the major parts of the process executed by the microcomputer 27 is shown.

At step S101 in FIG. 12, when a START reproduction switch (not shown in the figures) of the keyboard 2 becomes ON, the control advances to step S102. At step S102, the access operation for accessing the disk selection specified by the user for reproduction is started, and the signal reader 4 drives the disk 1 to read the selected information therefrom.

It is then determined at step S103 whether access is completed or not. This is accomplished by the subcode extractor 6 extracting the subcode information in the data read from the disk 1 by the signal reader 4, and confirming the reproduction position of the disk 1 based on information input to the microcomputer 27. More specifically, this conventional digital signal reproducing apparatus does not consider access to be completed when the optical pickup is located at any disk address other than that of the specified selection; access is completed when the optical pickup enters the specified selection after tracking the pit stream recorded to the disk 1.

Note that the address is not accessed by accessing the end of the selection preceding the desired selection, and then tracking forward from there as during normal reproduction. When access is not completed, step S103 loops back to step S102, jumps the pickup several tracks forward and back of the current position, and then re-evaluates whether access is completed. This loop of steps S102 and S103 is repeated until access is completed.

It is assumed below that after accessing the end of the track preceding the desired track, the pit path of the disk 1 is followed until the desired track is entered, and it is determined based on the subcode information that the desired track has been accessed.

At step S104, the subcode information from the disk 1 is stored to the microcomputer 27 as the accessed address information. It is to be noted that a CD-G disk wherein the video data DV and audio data DA are arranged, as shown in FIG. 13, is used as the disk 1 in this example.

If the user selects TNO=2, i.e., the second selection, blocks A to D in FIG. 13 are reproduced from TNO=1, and blocks E to I are reproduced from TNO=2. If access is completed, the signal reader 4 has sequentially reproduced blocks A to D of the information recorded to the disk 1, and it is detected that the signal reader 4 has begun reproducing block E. At this time the address on the disk 1 is assumed to be 5M00S00F meaning of 5 minutes 0 seconds 0 frames.

It is further assumed that the audio signal and the CD-G video signal start simultaneously from this block E. In actuality, however, the microcomputer 27 is unable to determine at the point the signal reader 4 begins to read the location of 5M00S00F on the disk 1 that access is completed. This determination is delayed by the time required for the signal reader 4 to read the data from the disk 1, the time required for the microcomputer 27 to read the subcode information extracted by the subcode extractor 6, and the time required for the evaluation itself. However, the microcomputer 27 therefore also reads the address information when the subcode information for the desired track (TNO=2) matches the address information at 5M00S00F, and the microcomputer 27 therefore stores in step S104 the disk address of 5M00S00F as the address at which access was completed.

The muting applied by the analog mute 19 is cancelled in step S105. This is because the response time of the analog mute 19, which precedes the amplifier 20 outputting to the speaker 21, is typically slow, and may be as long as approximately 100 msec. depending upon the integrated circuits and other components used as the speaker 21. In this example, analog muting is cancelled at the point access is completed, a pause state is then entered and held for a predetermined period (500 msec. in this example) until muting by the analog mute 19 is completely cancelled, the disk is then re-accessed, and the analog audio signal from the D/A converter 18 is input to the analog mute 19.

It is to be noted that the signal reader 4 is paused in step S106 to wait for muting by the analog mute 19 to be completely cancelled. Once the pause is initiated, the predetermined pause period is then counted in step S107. In addition, the signal reader 4 is paused at the 5M00S00F address of the disk 1 while the loop of steps 106 and 107 is executed, i.e., until the 500-msec. pause period of this example is completed.

Note, further, that the pause operation of this example refers to an operating loop whereby tracking is adjusted when the signal reader 4 exceeds the 5M00S00F address to move to a point before the 5M00S00F address, and the subcode information is read again to reposition the signal reader 4 as necessary. After the 500 msec. pause period is completed, the re-access operation is executed at step S108.

This re-access operation differs from the access operation executed in step S102, and seeks the disk position of the 5M00S00F address at which access was previously completed. This operation can be completed more quickly and easily than can re-executing the access operation of step S102.

It is then determined in step S109 whether re-access is completed. More specifically, access is completed when the optical pickup reaches the location of 5M00S00F on disk 1 after tracking the pit stream recorded to the disk 1; re-access is not executed by seeking an address before 5M00S00F and then tracking normally forward from there to 5M00S00F. If re-access is not completed, step S109 loops back to step S108, jumps the pickup several tracks forward and reverse of the current position, and then re-evaluates whether access is completed.

When re-access is completed, video muting is cancelled at step S110 so that the video information from the signal reader 4, and the subcode extractor 6 can be passed to the image data composer 26. The digital mute 17 is then controlled at step S111 to cancel digital muting and throughput the audio information from the signal reader 4 to the D/A converter 18.

In FIG. 13, a timing chart used to describe the operation for reading information recorded to the disk 1 by the conventional digital signal reproducing apparatus of FIG. 11 is shown. Note that an arrow Sm schematically represents the movement of the pickup of signal reader 4 with respect to the formatted recording data Sf stored in the disk 1.

The data Sf includes data blocks A to I and the followings sequentially arranged. Each data block further includes an audio data DA and a video data DV. The data track is changed from track TNO=1 to TNO=2 in block E wherein the video data DA includes image clear command CC therein, and a line St represents the track number which the microcomputer 27 detects. Also state of signals Sp, Sd, Svc, Sac, Svr, and Sar observed in the convention digital signal reproducing apparatus are shown.

With a conventional digital signal reproducing apparatus as thus described, the audio and video information recorded to the disk 1 and selected by the user is output by means of speaker 21 and video display 28.

However, with a conventional digital signal reproducing apparatus as described above, the first part of the video and audio information recorded to the disk 1 and selected by the user will be dropped and not output from the speaker 21 and video display 28 if the video information and audio information recorded to the disk start simultaneously from the first block of the user selection, as shown in FIG. 13. This is described below with reference to FIG. 13.

The completion of disk access detected in step S109 in FIG. 12 is confirmed after reproduction of the block E containing the 5M00S00F address subcode read by the microcomputer.27 from the output of the subcode extractor 6 is completed.

Even if access is confirmed completed at the beginning of block F by the microcomputer 27, and cancellation of video information muting and digital muting in steps S110 and S111 is delayed only one frame due to the processing time constraints of the program output from the microcomputer 27, the actual cancellation of this muting will not occur until the beginning of block G, as shown in FIG. 13. In addition, processing of the video and audio information by the D/A converter 18 and image data composer 26 does not begin immediately upon muting cancellation because there is normally a time delay caused by serial transmission of the muting cancellation signal, and because a certain amount of time is required after transmission of the muting cancellation signal to the digital mute 17 and video information mute 25 before video and audio information processing by the D/A converter 18 and image data composer 26 can begin.

As a result, processing of the video information by the image data composer 26 is delayed two frames after video muting is cancelled and starts at as indicating of block I, as indicated by signal Svr; and processing of the audio information by the D/A converter 18 is delayed one frame after digital muting is cancelled and starts at the beginning of block H as indicated by signal Sar. As a result, both video and audio information are dropped during blocks E–G.

While the first part of the audio information is thus dropped and abnormal sounds may result, the loss of video information in the CD-G format is even more severe: when a "clear screen" command (a "PRESET MEMORY" command) in block. E is included, and the user selects TNO=2 while a selection other than TNO=2 is being reproduced from a CD-G formatted disk, the video portion of that non-TNO=2 selection currently displayed on the video display 28 will not be cleared, the video portion of TNO=2 will be superimposed to the video already displayed, and it will not be possible to satisfactorily view either video portion.

SUMMARY OF THE INVENTION

The object of the present invention is therefore to provide an imaging device which solves these problems.

The present invention has been developed with a view to substantially solving the above described disadvantages and has for its essential object to provide an improved digital signal reproducing apparatus.

In order to achieve the aforementioned objective, a digital signal reproducing apparatus for reproducing a first data and a second data stored in digital forms with a position data indicative of the locations said first and second data in plural recording areas sequentially formed in a recording medium, said apparatus comprises a reproducing means for reading said recording areas to reproduce said first, second, and position data; a reproduction control means for controlling said reproducing means to read desirable areas of said recording areas; a reproduction position detecting means for detecting a currently reproduced position of said recording areas based on said reproduced position data to produce a position signal; a first muting means for muting said reproduced first data; a second muting means for muting said reproduced second data; an offset means for offsetting said reproducing means from a first position whereat said reproducing means completes the reading of said desirable areas based on said position signal; a first shift means for determining a first shift position sifted from said first position based on said position signal to produce a first shift signal; a first suppress means for suppressing the muting by said first muting means when said first shift position and said currently reproduced position match; a second shift means for determining a second shift position sifted from said first position based on said position signal to produce a second shift signal; and a second suppress means for suppressing the muting by said second muting means when said second shift position and said currently reproduced position match.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

Figure 1:
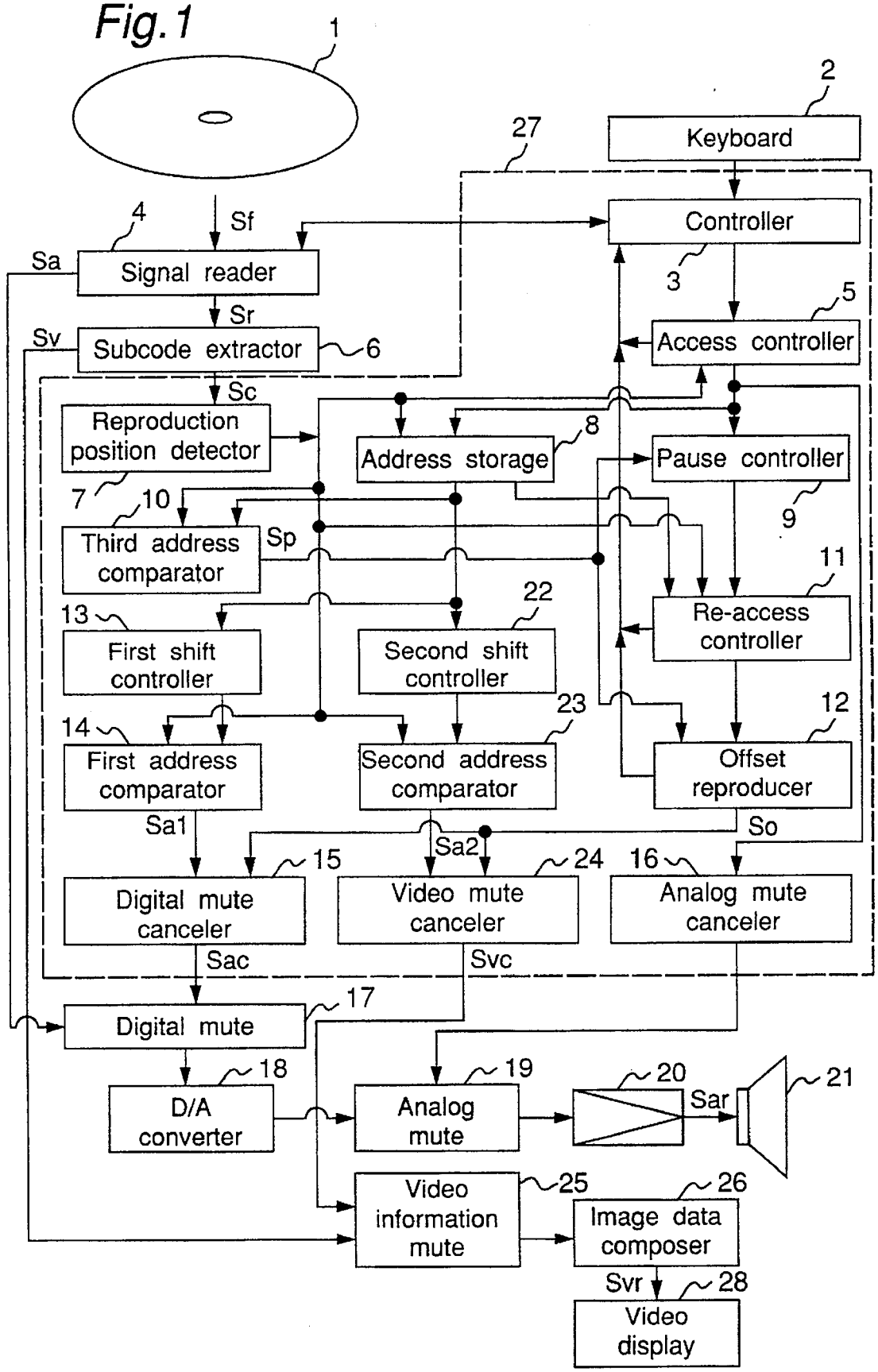
FIG. 1 is a block diagram of a digital signal reproducing apparatus according to a first embodiment of the present invention.

Referring to FIG. 1, a preferred embodiment of a digital signal reproducing apparatus according to the present invention is shown. A CD-graphic disk is an optically recorded digital disk, commonly known as a compact disk for digital audio, to which is recorded both audio information and still image (graphic) information be reproduced, and is referred to as "disk" hereafter. The disk 1 is read by a signal reader 4.

The signal reader 4 includes, for example, an optical pickup for reading the signals recorded to the disk 1, an optical pickup drive circuit, a drive control servo circuit, a disk drive motor, and a signal processing circuit for extracting the digital audio information and subcode signal containing the time code information and still image information.

Figure 10:
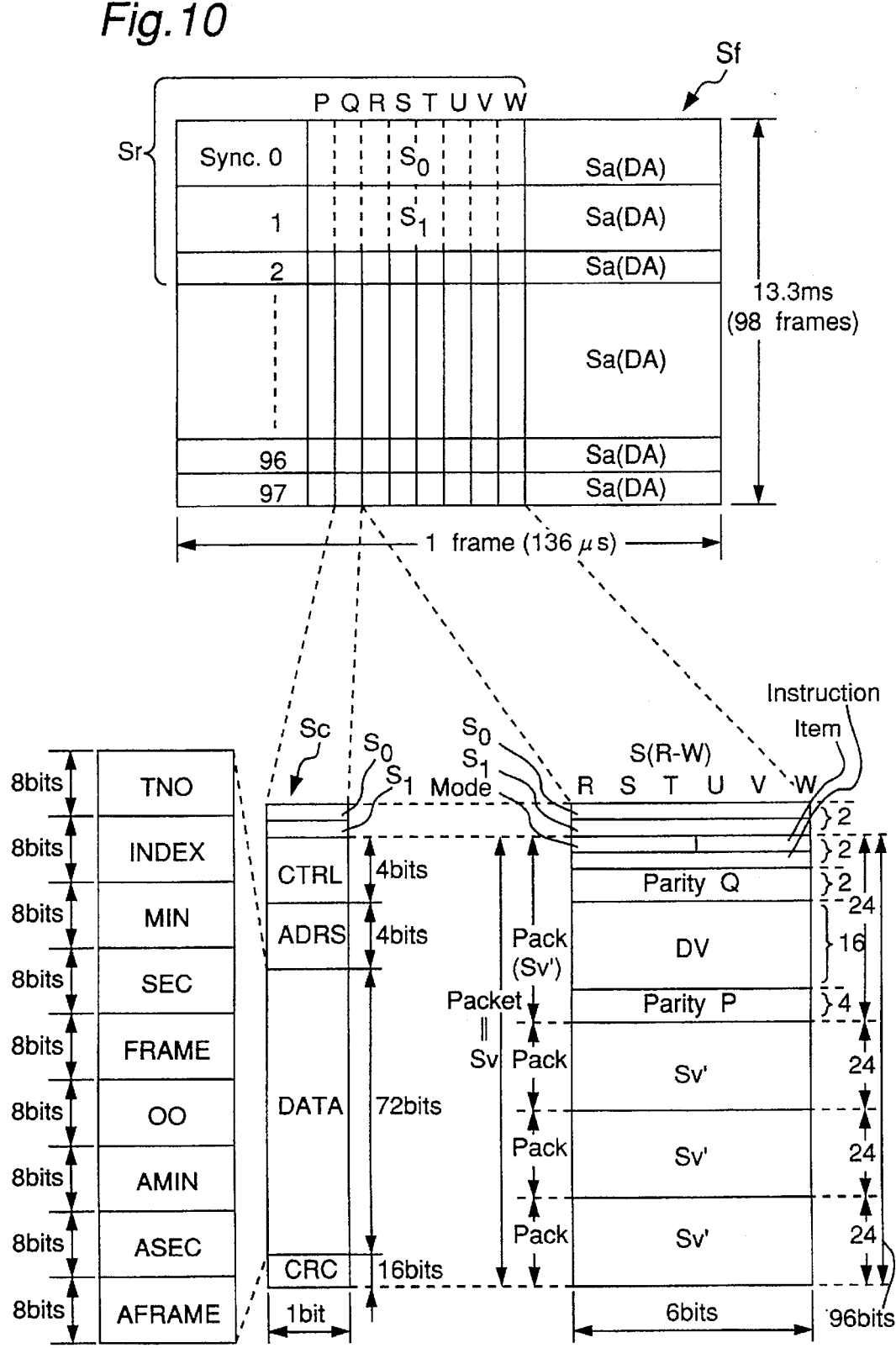
FIG. 10 is a graph schematically showing an example of a format of digital data stored in a digital audio compact disk (CD-DA)
Figure 11:
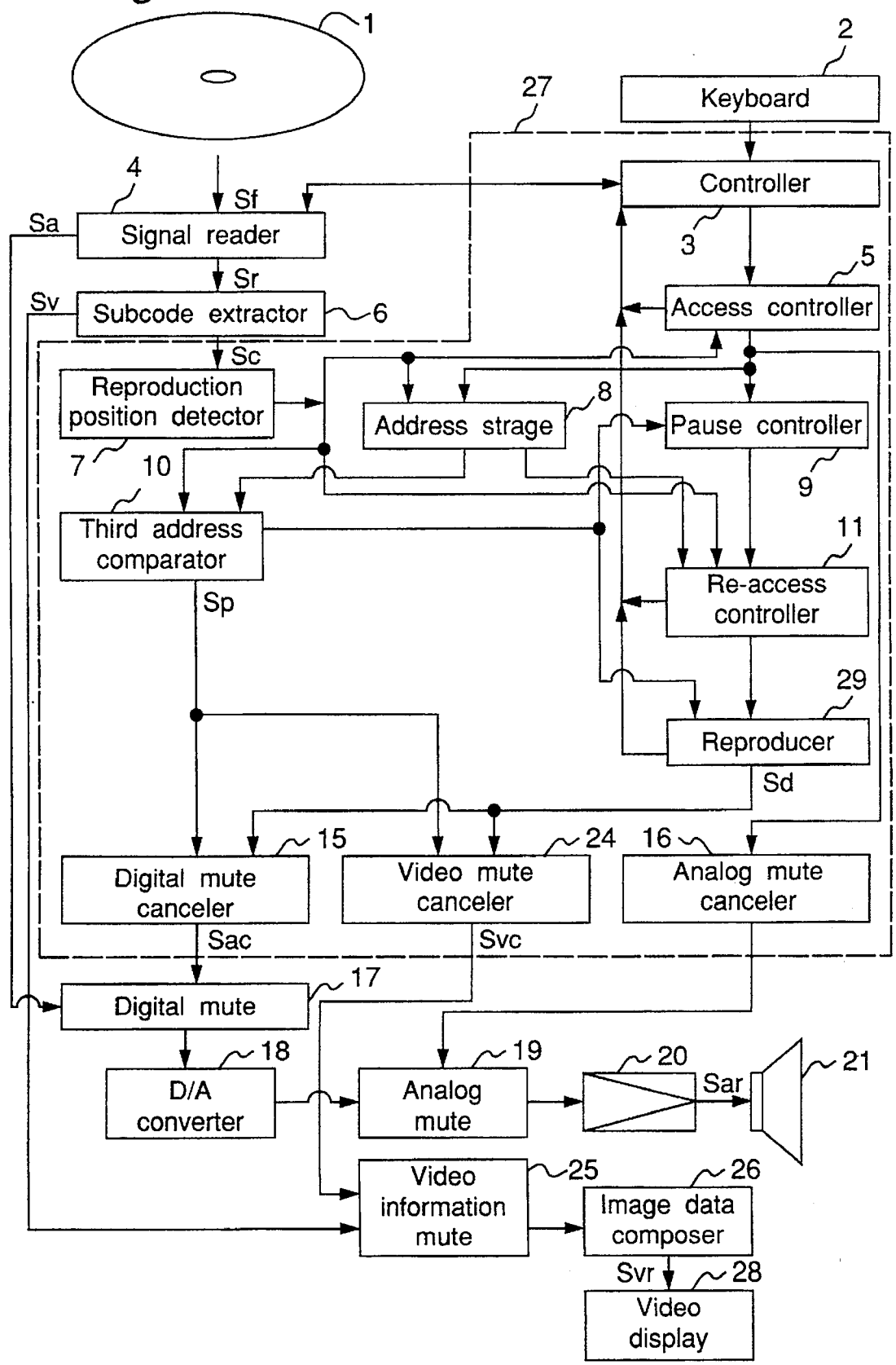
FIG. 11 is a block diagram of a conventional digital signal reproducing apparatus.
Figure 12:
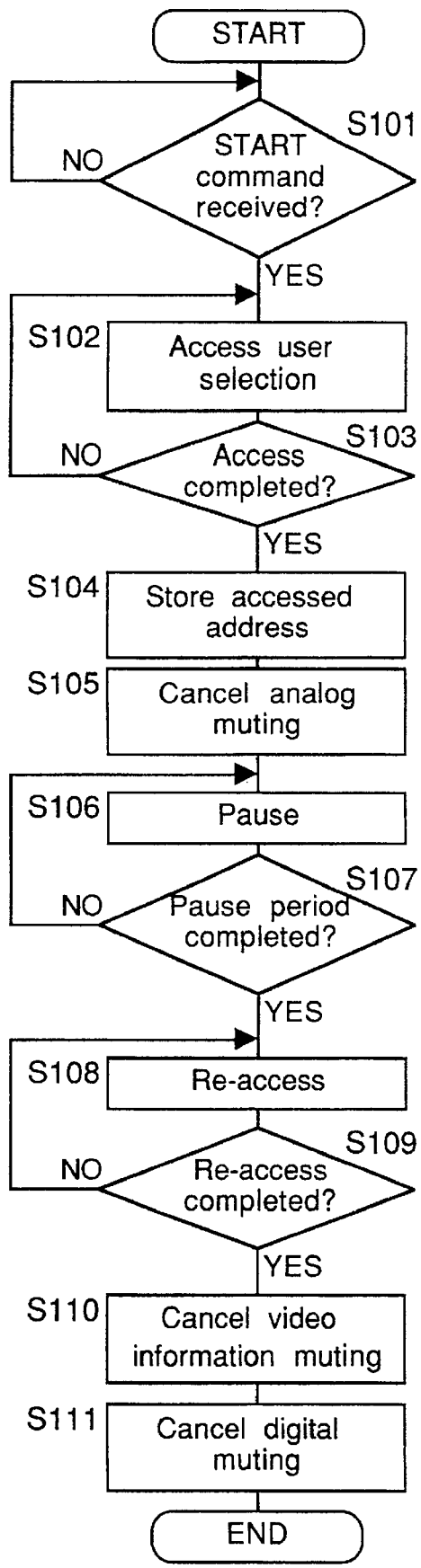
FIG. 12 is a flow chart showing the major steps in the processing operation executed by the microcomputer of the conventional digital signal reproducing apparatus of FIG. 11.
Figure 13:
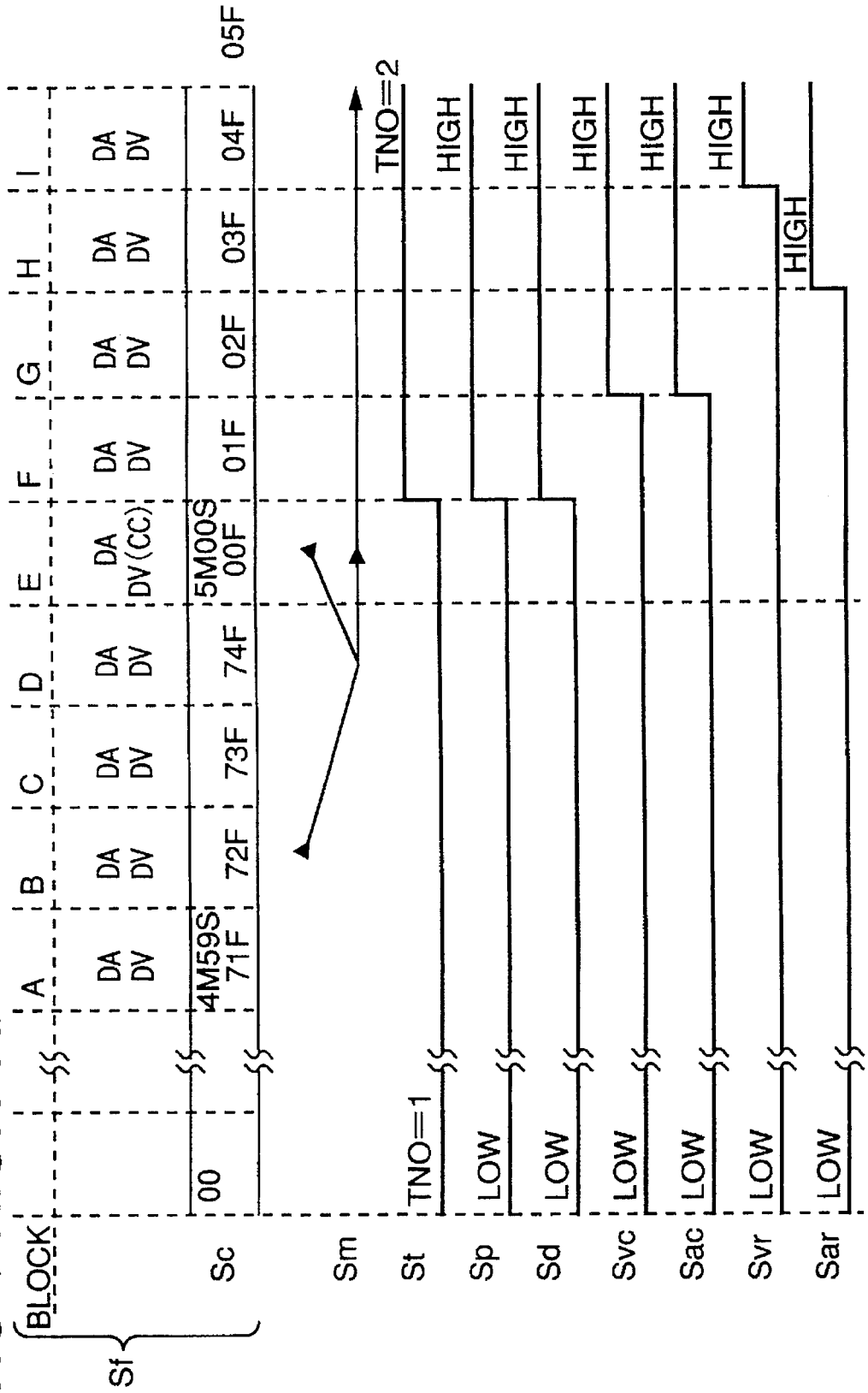
FIG. 13 is a timing chart used to describe the operation for reading information recorded to the disk by the convention digital signal reproducing apparatus of FIG. 11.

Referring to FIG. 10, a format of digital data stored in the disk 1, for example CD-DA, is schematically shown. A single frame data includes frame synchronization signals Sync of 24 bits, sub-coding of 1 symbol comprised of 14 bits, digital audio data Sa of 32 symbols each comprised of 14 bits (32×14), and 3 bits each for connecting the symbols. The digital audio data Sa is comprised of audio data DA and parity data.

The sub-coding includes eight of single bit date P, Q, R, S, T, U, V, and W. Data P is used for storing information indicative of an interlude between each track (music). Data Q stores information indicative of track No., index, minutes, second, and frame No. Data R, S, T, U, V, and W are used to store the video image data Sv indicative still or moving image information.

As best shown at the top of FIG. 10, ninety eight (98) of thus formatted frames make a data block Sf. However, ninety six (96) frames of sub-codings make a sub-coding data block, because top two frames thereof used for synchronization signals S0 and S1. Note that a portion of these top two frames S0 and S1 not including the digital audio data Sa therein is designated as a synchronization frame data Sr. A potion of this sub-coding data block corresponding to data Q is designated as a sub-code data Sc, wherein the positional information such as described in the above are obtained.

As shown on the right bottom of FIG. 10, a porion of sub-coding block wherein data R, S, T, U, V, and W not including frames S0 and S1 are designated as a packet (digital video data Sv). One quarter of the packet (digital video data) Sv is designated as a pack Sv'. Each pack Sv' is comprised of a video data DV and parities Q and P.

As shown on the center bottom of FIG. 10, thus formed sub-code data Sc is divided into four areas for a control CTL of 4 bits, an address ADRS of 4 bits, a data DATA of 72 bits, and cyclic redundant code CRC of 16 bits.

As shown on the left bottom of FIG. 10, the data area DATA is further formatted to have ten sub areas, 8 bits each, TNO., INDEX, MIN, SEC, FRAME, 00, AMIN, ASEC, and AFRAME. Since these format are well known to the person in the field of compact disk system, further description is omitted for the sake of brevity.

Referring back to FIG. 1, a keyboard 2 includes the buttons and switches manipulated by the user to operate the digital signal reproducing apparatus, and functions also as the reproducing position selection means. A main controller 27 indicated by a dot line is connected to the keyboard 2 for detecting the operation by the user, and is further connected to the signal reader 4 for interchanging various signals therebetween. The main controller 27 controls the major functions of the overall digital signal reproducing apparatus as well as the mechanical operation of the signal reader 4 based on thus obtained information or signals.

The signal reader 4 reproduces the data stored in the data block Sf recorded on the disk 1 to produce a synchronization frame data Sr and the digital audio data Sa. A digital mute 17 is connected to the signal reader 4 for receiving the digital audio data Sa therefrom. The digital mute 17 is connected to the main controller 27 for receiving a digital mute canceling signal Sac having two levels of HIGH and LOW therefrom. The conditions under which this signal Sac changes its level will be described later. When the digital mute canceling signal Sac is low, the digital mute 17 digitally mutes the digital audio data Sa. When the signal Sac is high, the digital mute 17 cancels muting of the audio data Sa.

A Digital to analog (D/A) convertor 18 is connected to the digital mute 17 for receiving thus muted or non-muted digital audio data Sa therefrom. The D/A converter 18 converts the digital data Sa received from the digital mute 17 to an analog audio signal.

An analog mute 19 is connected to the D/A convertor 18 and the main controller 27 for receiving the analog audio data and an analog mute canceling signal having two levels of HIGH and LOW therefrom, respectively. The conditions under which this analog mute canceling signal changes its level will be described later. When the analog mute cancel signal is low, the analog mute 19 mutes the analog audio signal received from the D/A converter. When the analog mute canceling signal is high, the analog mute 19 cancels the muting of the analog audio signal.

An amplifier 20 is connected to the analog mute 19 for receiving thus muted or non-muted analog audio signal therefrom and power amplifying at a constant amplification factor to thus received audio signal to produce an power amplified audio signal Sar. A speaker 21 is connected to the amplifier 20 for converting the power amplified audio signal Sar to sound waves.

A subcode extractor 6 is connected to the signal reader 4 for receiving the signal Sr to extract sub-code data Sc and digital video data Sv therefrom, and is further connected to the main controller 27 for transferring thus extracted sub-code data Sc thereto. A video information mute 25 is connected to the subcode extractor 6 and the main controller 27 for receiving the video signal Sv having two levels, HIGH and LOW, and a video mute canceling signal Svc therefrom, respectively. The condition under which this signal Svc changes its level will be described later.

When the video mute canceling signal Svc is low, the video information mute 25 digitally mutes the digital video data Sv. When the signal Svc is high, the video information mute 25 cancels the muting of the video data Sv.

An image data composer 26 is connected to the video information mute 25 for receiving thus muted or non-muted video data Sv for composing the image data signal Svr required for displaying an image. A television or other video display 28 is connected to the image data composer 26 for receiving the image data signal Svr to generate and display the image based on the signal Svr.

The main controller 27 includes a controller 3, an access controller 5, a reproduction position detector 7, an address storage 8, a pause controller 9, an address comparator 10, a re-access controller 11, an offset reproducer 12, a first shift means 13, a first address comparator 14, a digital muting canceler 15, an analog muting canceler 16, a second shift controller 22, a second address comparator 23, and a video muting canceler 24 which are connected to each other, as best shown in FIG. 1. The controller 3 is further connected to the keyboard 2 and the signal reader 4 for interchanging various signals therebetween so that main control 27 can control the major functions of the overall digital sinal reproducing apparatus as well as the mechanical operation of the signal reader 4.

The reproduction position detector 7 is further connected to the sub-code extractor 6 for receiving the extracted sub-code data Sc to detect the current reproduction position of the disk 1. Note that the reproduction position of the disk 1 corresponds to the address of the data, stored in the disk 1, currently scanned by the pickup of signal reader 4. The access controller 5 drives the controller 3 to control the signal reader 4 to access the desired reproduction position of the disk 1. The address storage 8 stores the disk address output from the reproduction position detector 7 when the access controller 5 detects that the signal reader 4 completed the access to the designated position of the desk 1. At this time, the analog muting canceler 16 produces the analog muting canceling signal having HIGH level. On receipt of this HIGH level signal muting canceling signal, the analog mute 19 cancels the muting applied to the audio signal. The address comparator 10 (hereinafter referred to as "the third address comparator 10") compares the value of the output from the address storage 8 with that from the reproduction position detector 7 to produces an address comparison signal Sp.

When the access controller 5 detects that the access is completed, the pause controller 9 pauses at that address for a predetermined period based on the address comparison signal Sp. When the predetermined pause imposed by the pause controller 9 is completed, the re-access controller 11 controls the signal reader 4 to re-access to the reproduction position, stored in the address storage 8, of the disk 1.

The offset reproducer 12 produces an offset signal when the access operation of the re-access controller 11 is confirmed based on the address comparison signal Sp. On the production of this offset signal, the main controller 27 offsets the signal reader 4 (the disk track being produced) to a track position before the current reproduction position to immediately resume the reproduction state from the offset track position. Note that it takes about 2 or 3 msec. for the signal reader 4 to complete the offset motion. After the pickup's offset is completed, the offset reproducer 12 further produces a reproduction resuming signal So to resume the signal reproduction.

The first shift controller 13 adds or subtracts a constant value to or from the reproduction position information of the disk 1 stored by the address storage 8 when access by the access controller 5 is completed. Then, the shift controller 13 stores the sum or difference value.

The first address comparator 14 compares the value of the reproduction position information stored by the first shift controller 13 with that of the output of the reproduction position detector 7, and produces a first address comparison signal Sa1 having two levels. This first address comparison signal Sa1 turns "HIGH" when both of two compared signals become the same, meaning that the pickup of signal reader 4 once reaches or passes through the designated address stored in the first shift controller 13.

The digital muting canceler 15 is further connected to the digital mute 17, and produces the digital muting cancelling signal Sac. This cancelling signal Sac turns "HIGH" when it is detected based on the first address comparison signal Sa1 that the reproduction position stored by the first shift controller 13 is passed after re-access by the offset reproducer 12 is completed. On receipt of this "HIGH" signal Sac, the digital mute 17 cancels the muting applied to the audio digital data Sa.

The second shift controller 22 adds or subtracts a constant value to or from the disk reproduction position information stored by the address storage 8 when access by the access controller 5 is completed.

The second address comparator 23 compares the reproduction position information stored by the second shift controller 22 with the value of the output of the reproduction position detector 7, and produces a second address comparison signal Sa2 having. This second address comparison signal Sa2 turns "HIGH" when both of two compared signals become the same, meaning that the pickup of signal reader 4 once reaches or passes through the designated address stored in the second shift controller 22.

The video muting canceler 24 is further connected to the video information mute 25, and produces the video muting cancelling signal Svc. This cancelling signal Svc becomes "HIGH" only when it is detected based on the second address comparison signal Sa2 that the reproduction position stored by the second shift means 22 is passed after re-access by the offset reproducer 12 is completed. On receipt of this "HIGH" signal Sa2, the video information mute 25 cancels the muting applied to the digital video data Sv.

Note that the components contained within the dotted line in FIG. 1 are typically comprised within the main controller 27, which with the appropriate software stored in a microcomputer achieves and controls the major functions of the digital signal reproducing apparatus.

Figure 2:
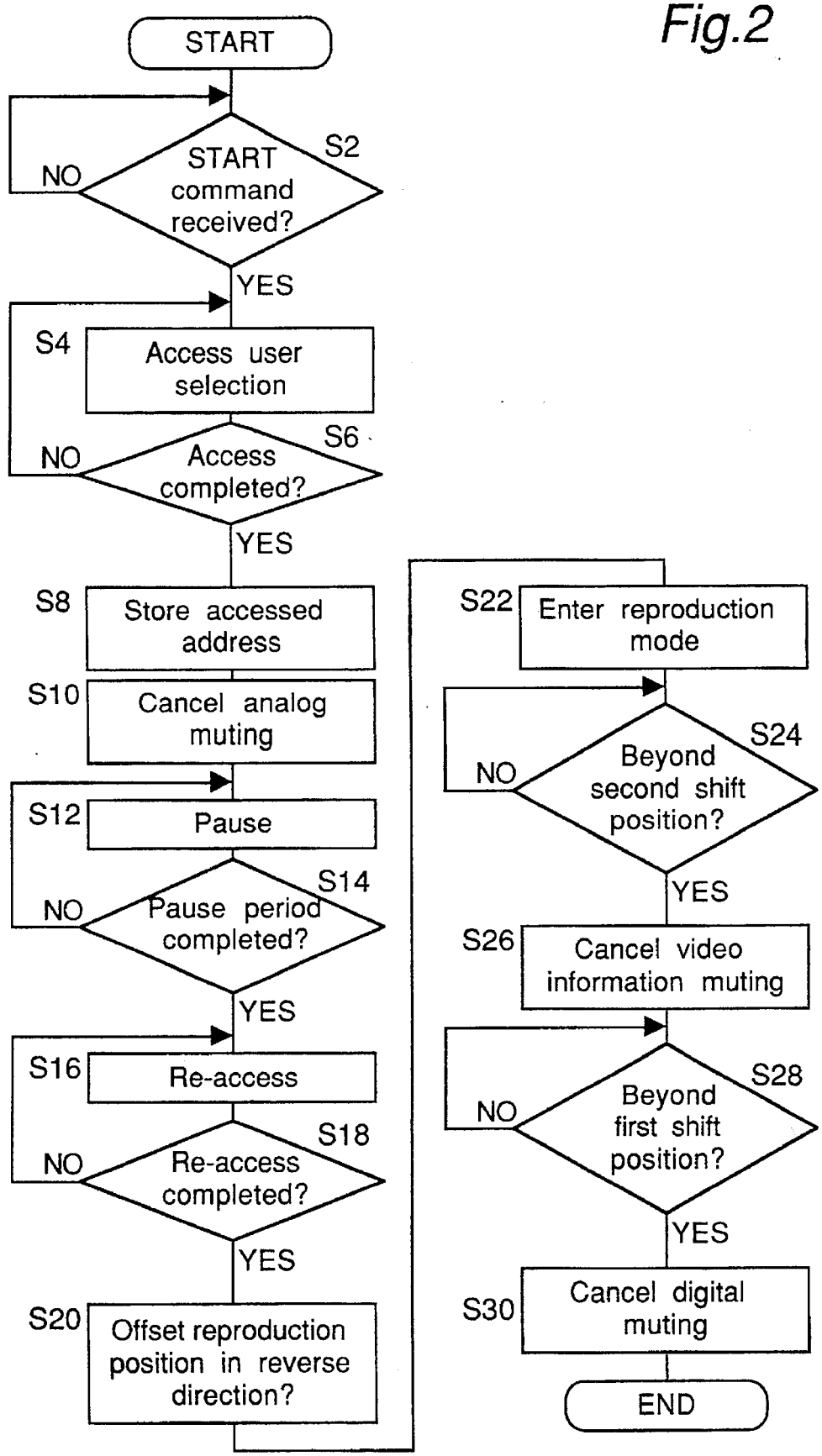
FIG. 2 is a flow chart showing the major steps in the processing operation executed by the digital signal reproducing apparatus of FIG. 1.
Figure 3:
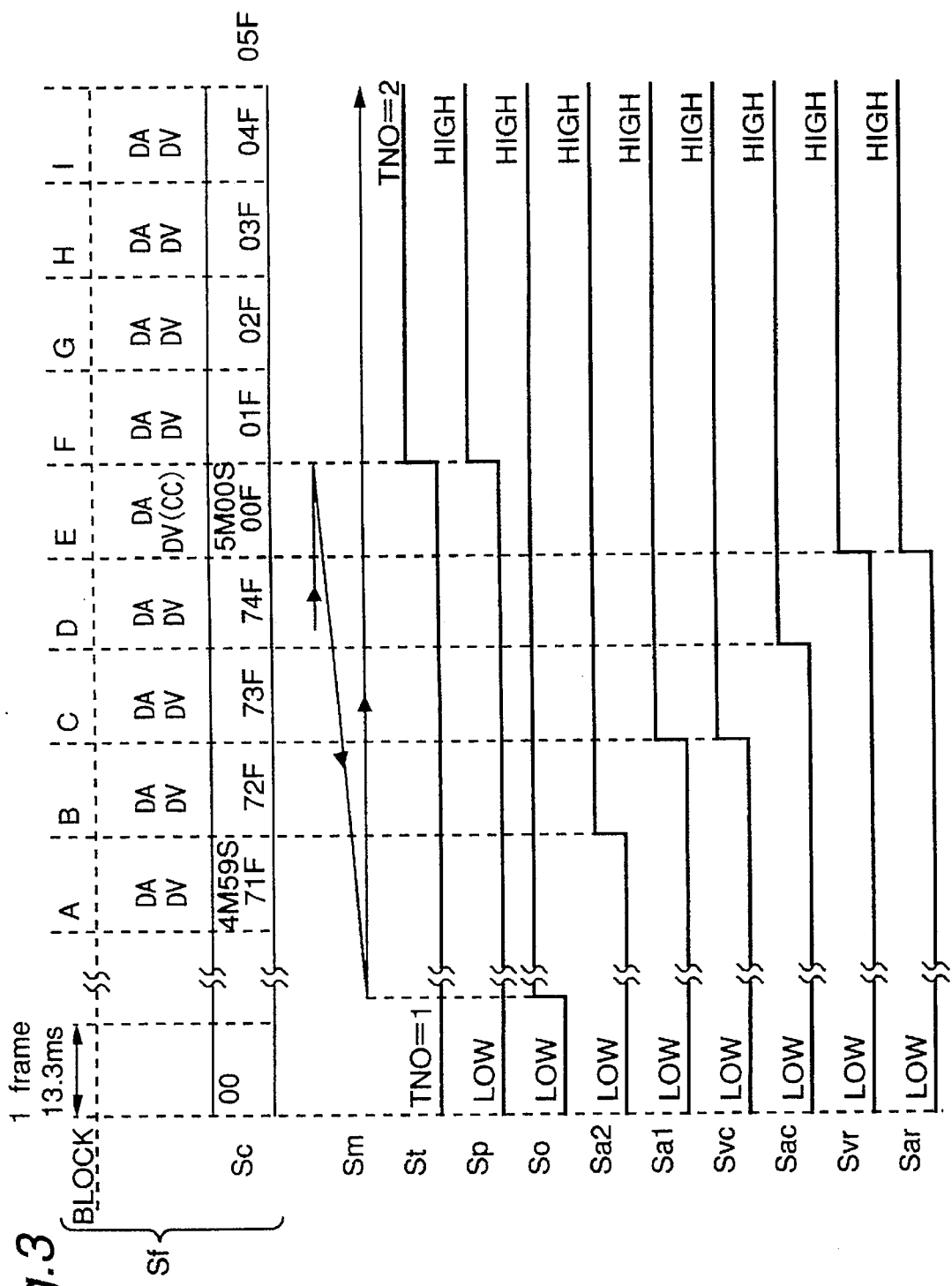
FIG. 3 is a timing chart used to describe the operation for reading information recorded to the disk by the digital signal reproducing apparatus of FIG. 1.

With reference to FIGS. 2 and 3, the operation of digital signal reproducing apparatus of FIG. 1 is described below. FIG. 2 is a flow chart showing the major steps in the processing operation executed by the main controller 27.

At step S2, when a START reproduction switch (not shown in the figures) of the keyboard 2 becomes ON, the control advances to step S4.

At step S4, the access operation for accessing the disk selection specified by the user for reproduction is started, and the signal reader 4 drives the disk 1 to read the selected information therefrom.

At step S6, it is then determined whether access is completed or not. This is accomplished by the subcode extractor 6 extracting the subcode information in the data read from the disk 1 by the signal reader 4, and confirming the reproduction position of the disk 1 based on information input to the main controller 27. More specifically, it is considered that access is still not completed when the optical pickup is located at any disk address other than that of the specified selection; and that access is completed when the optical pickup enters the specified selection after tracking the pit stream recorded to the disk 1.

Note that the address is not accessed by accessing the end of the selection preceding the desired selection, and then tracking forward from there as during normal reproduction. When access is not completed, step S6 loops back to step S4, jumps the pickup several tracks forward and back of the current position, and then re-evaluates whether access is completed. This loop of steps S4 and S6 is repeated until access is completed.

It is assumed below that after accessing the end of the track preceding the desired track, the pit path of the disk 1 is followed until the desired track is entered, and it is determined based on the subcode information that the desired track has been accessed.

At step S8, the subcode information from the disk 1 is stored to the main controller 27 as the accessed address information. It is to be noted that a CD-G disk wherein the video data DV and audio data DA are arranged, as shown in FIG. 3, is used as the disk 1 in this example. In this disk 1, the track TNO=1 is comprised of blocks A, B, C, and D; and the track TNO=2 is comprised of blocks E, F, G, H, I and following blocks (not shown in FIG. 3).

If the user selects the track TNO=2, i.e., the second selection, the access completion is detected when the signal reader 4 begun reproducing block E after sequentially reproducing blocks A to D of the information recorded to the disk 1. At this time the address on the disk 1 is assumed to be 5M00S00F meaning of 5 minutes 0 seconds 0 frames.

It is further assumed that the audio signal and the CD-G video signal start simultaneously from this block E. In actuality, however, the main controller 27 is unable to determine at the point the signal reader 4 begins to read the location of 5M00S00F on the disk 1 that access is completed. This determination is delayed by the time required for the signal reader 4 to read the data from the disk 1, the time required for the main controller 27 to read the subcode information extracted by the subcode extractor 6, and the time required for the evaluation itself. However, the main controller 27 therefore also reads the address information when the subcode information for the desired track (TNO=2) matches the address information at 5M00S00F, and the main controller 27 therefore stores the disk address of 5M00S00F as the address at which access was completed at the step S8.

At step S10, the muting applied by the analog mute 19 is cancelled. This is because the response time of the analog mute 19, which precedes the amplifier 20 outputting to the speaker 21, is typically slow, and may be as long as approximately 100 msec. depending upon the integrated circuits and other components used as the speaker 21. In this example, analog muting is cancelled at the point access is completed, a pause state is then entered and held for a predetermined period (500 msec. in this example) until muting by the analog mute 19 is completely cancelled, the disk is then re-accessed, and the analog audio signal from the D/A converter 18 is input to the analog mute 19.

At step S12, it is to be noted that the signal reader 4 is paused to wait for muting by the analog mute 19 to be completely cancelled.

At step S14, a predetermined pause period is then counted after the pause is initiated at step S12. In addition, the signal reader 4 is paused at the 5M00S00F address of the disk 1 while the loop of steps S12 and S14 is executed, i.e., until the 500-msec. pause period of this example is completed. Note, further, that the pause operation of this example refers to an operating loop whereby tracking is adjusted when the signal reader 4 exceeds the 5M00S00F address to move to a point before the 5M00S00F address, and the subcode information is read again to reposition the signal reader 4 as necessary. After the 500 msec. pause period is completed, the procedure advances to step S16.

At step S16, re-access operation is executed. This re-access operation differs from the access operation executed in step S4, and seeks the disk position of the 5M00S00F address at which access was previously completed. This operation can be completed more quickly and easily than can re-executing the access operation of step S4.

At step S18, it is judged whether re-access is completed or not. More specifically, access is completed when the optical pickup reaches the location of 5M00S00F on disk 1 after tracking the pit stream recorded to the disk 1; re-access is not executed by seeking an address before 5M00S00F and then tracking normally forward from there to 5M00S00F. If re-access is not completed, step S18 loops back to step S16, jumps the pickup several tracks forward and reverse of the current position, and then re-evaluates whether access is completed or not. After re-access is confirmed completed, the procedure advances to step S20.

At step S20, the reproduction track on the disk 1 is offset to a point preceding the re-accessed position, thus moving the reproduction position to a point approximately ten frames before the accessed address.

At step S22, reproduction following the pit path on the disk 1 is started without offsetting the reproduction track and with both video information muting and digital (audio) muting applied.

At step S24, control waits until a disk position located a predetermined period (distance) before the initially accessed disk position is passed. In the case of the present embodiment, control waits for a period equal to the delay time required for video information muting, or approximately four frames before the initially accessed disk position. Therefore, if the initially accessed disk position is at 5M00S00F, control waits until the disk position at 4M59S71F is passed. When the disk position at 4M59S71F is passed, the procedure advances to step S26.

At step S26, video information muting is cancelled, and the video information from the signal reader 4 and subcode extractor 6 is transferred to the image data composer 26. As a result of this control method, the signal reader 4 skips back to a point on the disk 1 preceding the accessed disk address (before 5M00S00F) after accessing the disk 1 at 5M00S00F whereat the track changes from TNO=1 to TNO=2, and then resumes the reproduction mode from that point (before 4M59S71F) as shown by the arrow Sm in FIG. 3.

The main controller 27 then begins the video muting cancellation operation at the point the block A corresponding to the offset address 4M59S71F is read, and cancels video information muting by the video information mute 25 at the beginning of block C. By detecting cancellation of video information muting, the image data composer 26 can begin generating the screen data using the video information from block E, i.e., using the video information from the recording start position at TNO=2, and there is therefore no loss of video information apparent on the video display 28.

Thereafter at step S28, control waits until a disk position located a predetermined period (distance) before the initially accessed disk position (5M00S00F) is passed. In the present embodiment, this predetermined period is a period equal to the delay time required for digital (audio information) muting, or approximately three frames before the initially accessed disk position. Therefore, if the initially accessed disk position is at 5M00S00F, control waits until the disk position at 4M59S72F is passed. The procedure therefore advances to step S30 when the disk position at 4M59S72F is passed.

At step S30, digital muting (audio information muting) is cancelled, and the digital mute 17 is controlled to transfer the audio information from the signal reader 4 to the D/A converter 18.

As a result of this control method, as with the case where video muting is cancelled in step S26 described above, the signal reader 4 skips back to a point on the disk 1 preceding the accessed disk address (5M00S00F) after accessing the disk 1 at 5M00S00F whereat the track changes from TNO=1 to TNO=2, and then resumes the reproduction mode from that point (4M59S72F). The main controller 27 then begins the digital muting cancellation operation at the point the block B corresponding to the offset address 4M59S72F is read, and cancels digital information muting by the digital mute 17 at the beginning of block D.

By detecting cancellation of digital muting, the D/A converter 18 can begin generating the audio output signal using the audio information from block E, i.e., using the audio information from the video information recording start position at TNO=2, and there is therefore no loss of audio information apparent in the output from the speaker 21.

Referring to FIG. 3, a timing chart used to describe the operation for reading information recorded to the disk 1 by the digital signal reproducing apparatus of FIG. 1 is shown. Note that an arrow Sm schematically represents the movement of the pickup of signal reader 4 with respect to the formatted recording data Sf stored in the disk 1.

The data Sf includes data blocks A to I and the followings sequentially arranged. Each data block further includes an audio data DA and a video data DV. The data track is changed from track TNO=1 to TNO=2 in block E wherein the video data DA includes image clear command CC therein. A line St represents the track number which the main controller 27 detects. Also state of signals Sp, So, Sa2, Sa1, Svc, Sac, Svr, and Sar observed in the digital signal reproducing apparatus according to the present invention are shown.

As indicated the arrow Sm, the pick up of signal reader 4 scans the data block frame by frame in forward direction (to the right side in FIG. 3). According to the movement of the pickup 4, the main controller 27 also detects the track position TNO sequentially, as indicated the line St. When the pickup 4 passes over the position representing the access completion stored in the address storage 8 during the re-accessing operation, the third address comparator 10 outputs the address comparison signal Sp (hereinafter referred to as "the third address comparison signal Sp") having HIGH level.

On receipt of this HIGH level signal Sp, the offset reproducer 12 produces offset signal. Then, the pickup 4 is offset or moved backward to the position about 10 frames preceding to the current position. After completion of the offsetting the pickup 4, the offset reproducer 12 produces reproduction resuming signal So (HIGH) in the offset frame, as indicated by the line So.

The second address comparator 23 produces the second address comparison signal Sa2 (HIGH), as indicated by the line Sa2, when the pickup 4 passes over the positron (frame 4M59S71F: block A) stored in the second shift controller 22. In other words, the HIGH signal Sa2 is produced when both the outputs from the second shift controller 22 and reproduction position detector 7 become the same.

The first address comparator 14 produces the first address comparison signal Sa1 (HIGH), as indicated by the line Sa1, when the pickup 4 passes over the position (frame 4M59S72F: block B) stored in the first shift controller 13. In other words, the HIGH signal Sa1 is produced when both the outputs from first shift controller 13 and reproduction position detector 7 become the same.

The video muting canceler 24 produces the video mute canceling signal Svc (HIGH) after the production of those HIGH level signals So and Sa2 to cancel the muting of the analog audio signal applied by the analog mute 19, as indicated by the line Svc, at the position (frame 4M59S73F: block C). Note that even if the muting is canceled during the reproduction of the block B (frame 4M59S72F), the video information mute 25 outputs the video data of block C (frame 4M59S73F). Therefore, the cancellation of muting is executed from the block C according this embodiment of the present invention.

The digital muting canceler 15 produces digital muting cancelling signal Sac (HIGH) after the production of those HIGH level signals So and Sa1 to cancel the muting of the digital video data Sv applied by the video information mute 25, as indicated by the line Sac, at the positron (frame 4M59S74F: block D). Note that even if the muting is canceled during the reproduction of the block C (frame 4M59S73F), the digital mute 17 outputs the video data of block D (frame 4M59S74F). Therefore, the cancellation of muting is executed from the block D according this embodiment of the present invention.

The image data signal Svr is output from the image data composer 26 two frames after the muting cancellation by the video muting canceler 24. And, the power amplified audio signal Sar is output from the amplifier 20 one frame after the muting cancellation by the digital muting canceler 15.

By means of a digital signal reproducing apparatus according to the first embodiment of the invention thus described, it is possible to provide a digital signal reproducing apparatus whereby the video and audio information recorded to a disk 1 can be output from the video display 28 and speaker 21 with no loss of information.

Second Embodiment

Figure 4:
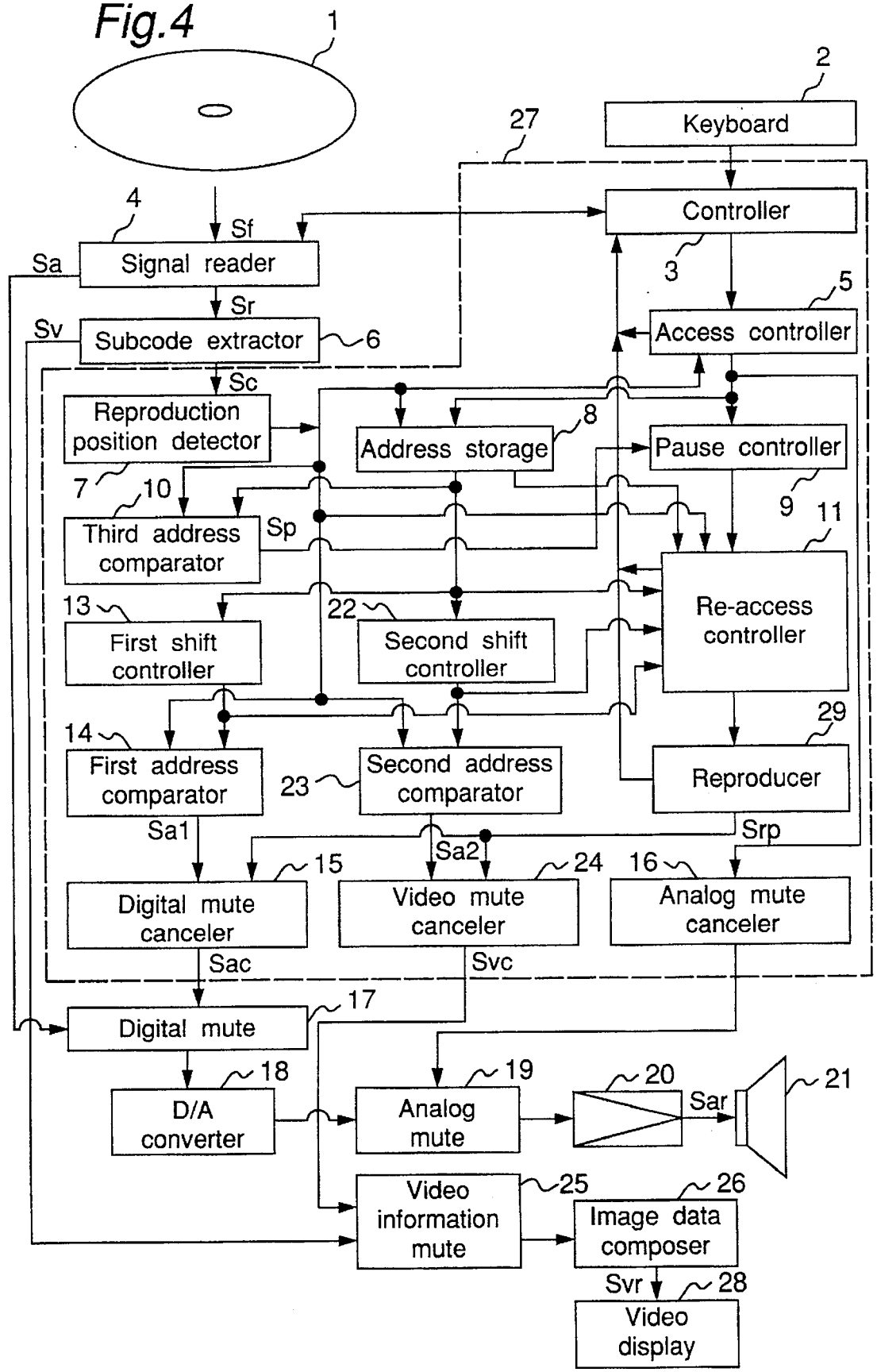
FIG. 4 is a block diagram of a digital signal reproducing apparatus according to a second embodiment of the present invention.

Referring to FIG. 4, an alternative of digital signal reproducing apparatus of FIG. 1 is shown. According to this embodiment, the offset reproducer 12 in FIG. 1 is replaced by a reproducer 29. However, the re-access controller 11 further selects the position information indicating the disk address that is first in the direction of disk reproduction, and then causes the signal reader 4 to access said first position, when compared with that in FIG. 1. Note that the position information selected is either the first shift position information output from the first shift controller 13, or the second shift position information output from the second shift controller 22.

The reproducer 29 produces a reproduction signal Srp to start the signal reproduction when the access operation executed by the re-access controller 11 is confirmed completed based on the output from the pause controller 9. After re-access is completed and it is confirmed that the reproducer 29 has passed the reproduction position stored in the address storage 8, the digital muting canceler 15 cancels muting by the digital mute 17 on receipt of the reproduction signal Srp. After the transition to the reproduction operation of the reproducer 29 is completed, and the reproduction position stored in the address storage 8 is detected to have been passed based on the output from the address comparator 10, the video muting canceler 24 cancels muting by the video information mute 25.

Figure 5:
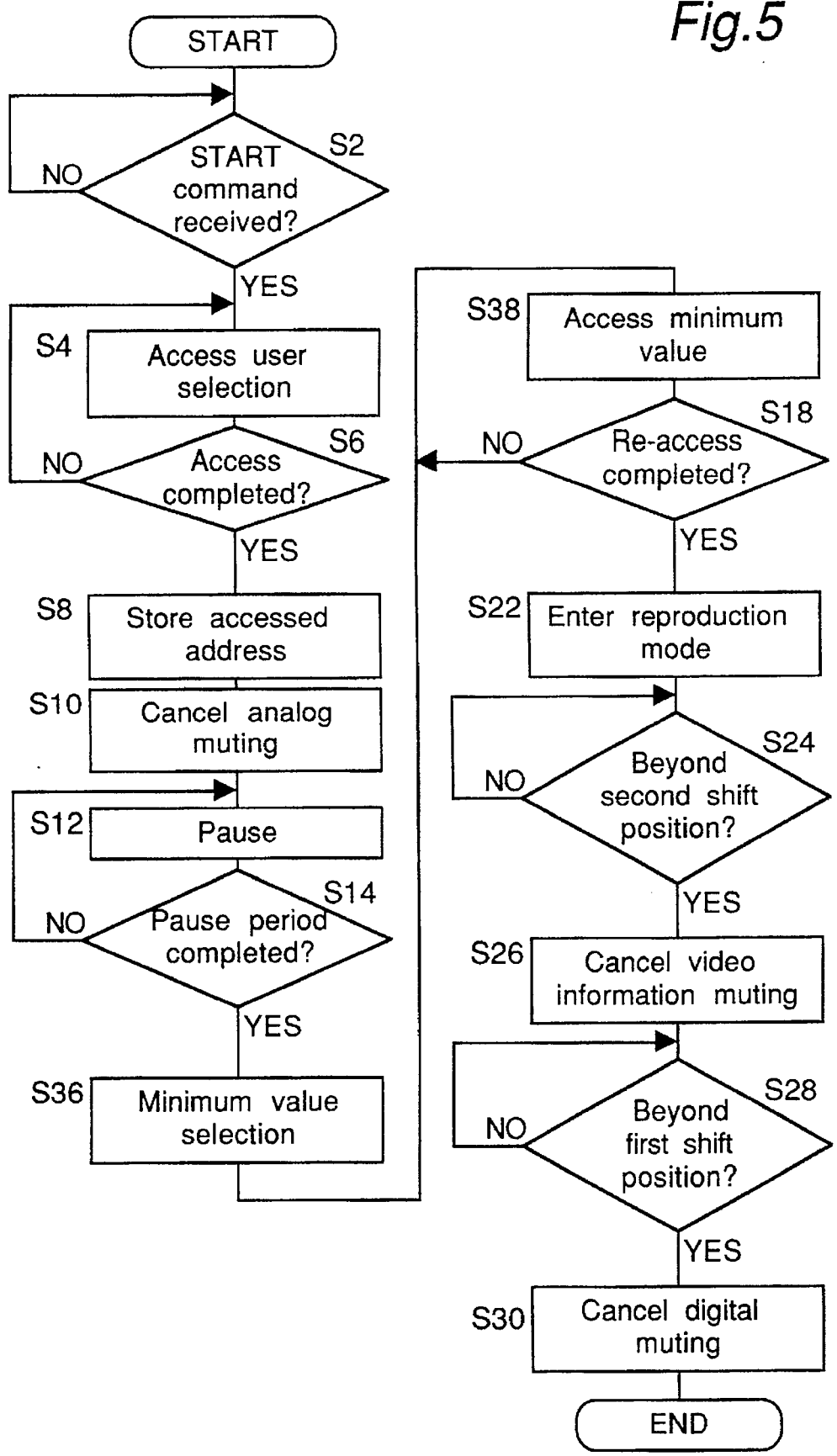
FIG. 5 is a flow chart showing the major steps in the processing operation executed by the digital signal reproducing apparatus of FIG. 4.

Referring to FIG. 5, a flow chart describing the major steps in the processing operation executed by the main controller 27 of the digital signal reproducing apparatus of FIG. 4 is shown. According to this embodiment, the step S16 in FIG. 2 is replaced by new steps S36 and S38, and the step S20 is removed therefrom. As a result, the operation of this embodiment differs from that of FIG. 2 in the following points.

At step S14, a 500 msec. pause period is counted after the pause is initiated at step S12 to wait for muting by the analog mute 19 to be completely cancelled, as same as in the first embodiment (FIG. 2).

At step S36, the disk position at frame 4M59S71F preceding the initially accessed disk position at frame 5M00S00F by the delay time required for video information muting (four frames in this embodiment), and the disk position at 4M59S72F preceding the initially accessed disk position by the delay time required for digital (audio information) muting (three frames in this embodiment), are compared, and the disk position with the lowest value is selected. It is assumed below that the disk position at 4M59S71F is the lowest value. Then the procedure advances to step S38.

At step S38, the re-access operation is executed to access the 4M59S71F disk position selected as the smallest value. Note that this re-access operation seeks the disk position of 4M59S71F, and does not seek the previously accessed disk position at 5M00S00F as occurs with step S16 of the first embodiment above.

It is then determined in step S18 whether re-access is completed or not. More specifically, re-access is completed when the optical pickup reaches the disk position of 4M59S71F on disk 1 after accessing a point preceding 4M59S71F and then tracking the pit stream recorded to the disk 1 in the reproduction direction to 4M59S71F. If re-access is not completed, step S18 loops back to repeat step S38, jumps the pickup several tracks forward and reverse of the current position, and then re-evaluates in step S18 again whether access is completed or not.

When it is determined that re-access is completed, the procedure advances to step 22, whereat reproduction following the pit path on the disk 1 is resumed without offsetting the reproduction track.

Operation after this point is the same as in the first embodiment described above, and further description is therefore omitted below.

Figure 6:
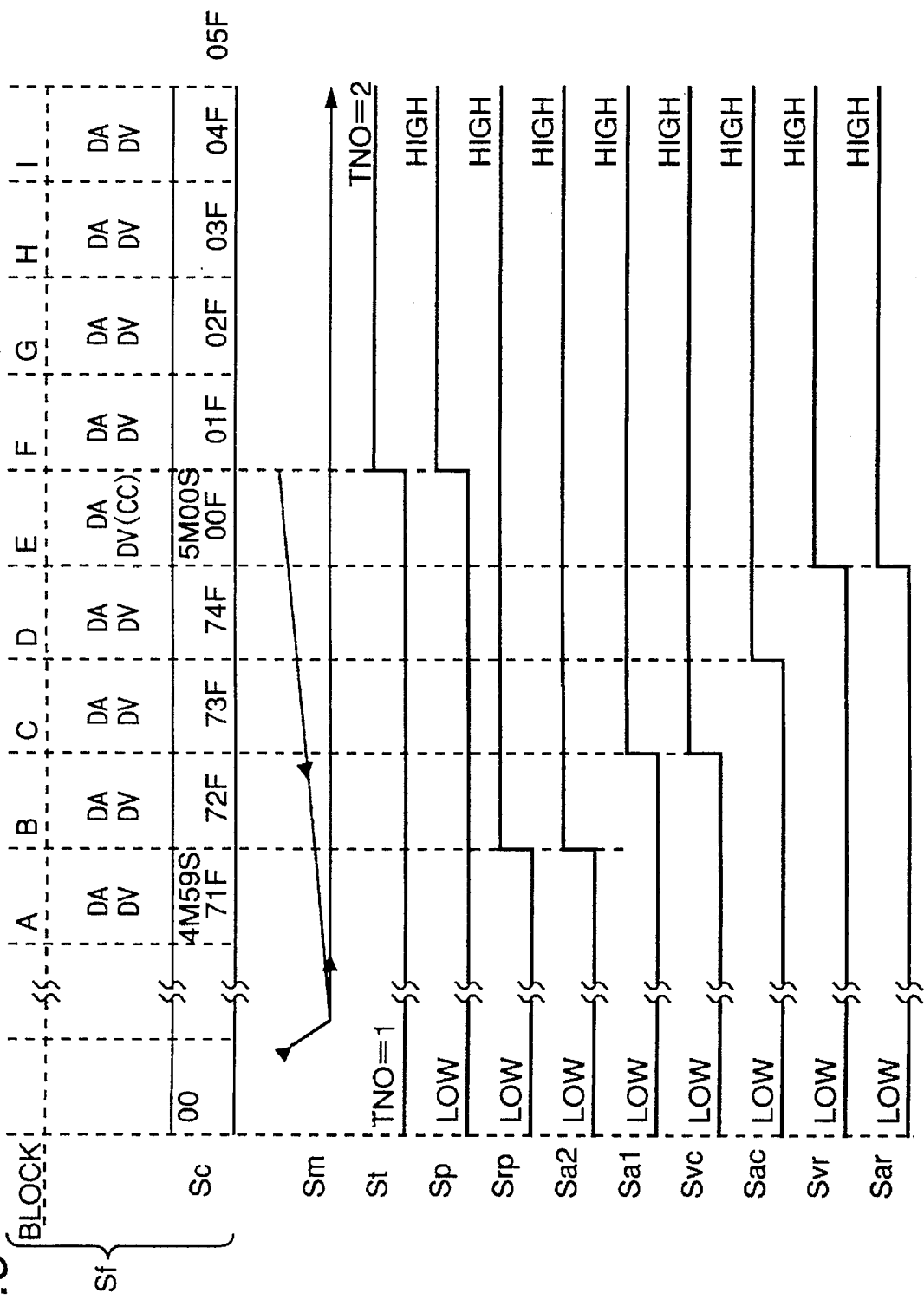
FIG. 6 is a timing chart used to describe the operation for reading information recorded to the disk by the digital signal reproducing apparatus of FIG. 4.

As a result of this control method, if the main controller 27 pauses after accessing the disk 1 at 5M00S00F whereat TNO=2, cancels the pause after waiting the predetermined period, accesses the disk at 4M59S71F, and then enters the reproduction mode, as best shown in FIG. 6, the main controller 27 begins the video muting cancellation operation at the point the block A corresponding to the offset address 4M59S71F is read, and cancels video information muting by the video information mute 25 at the beginning of block C. By detecting cancellation of video information muting, the image data composer 26 can begin generating the screen data using the video information from block E, i.e., using the video information from the recording start position at TNO=2, and the loss of video information will not be apparent on the video display 28. Operation after this point is the same as in the first embodiment described above, and further description is therefore omitted below.

Referring to FIG. 6, a timing chart similar to that of FIG. 3 used to describe the operation for reading information recorded to the disk 1 by the digital signal reproducing apparatus of FIG. 4 is shown. Note that the operation very similar to that of the first embodiment described with reference to FIG. 3 is shown in FIG. 6, but the reproduction resuming signal So is replaced by the reproduction signal Srp. As a result, the operation of this embodiment differs from the first embodiment only in that the reproducer 29 produces the reproduction signal Srp (HIGH) when the pickup 4 passes over the position (block A: frame 4M5971F) stored in the second shift controller 22.

By means of a digital signal reproducing apparatus according to the second embodiment thus described, the reproduction operation can be executed faster than is possible by means of the first embodiment whereby the offset reproducer 12 offsets the reproduction position of the signal reader 4 farther than is actually necessary (to a point preceding 4M59S71F in this embodiment). More specifically, it is possible to provide a digital signal reproducing apparatus whereby the video and audio information recorded to a disk 1 can be output from the video display 28 and speaker 21 with no loss of information without reducing the reproduction processing speed of the disk.

Third Embodiment

Figure 7:
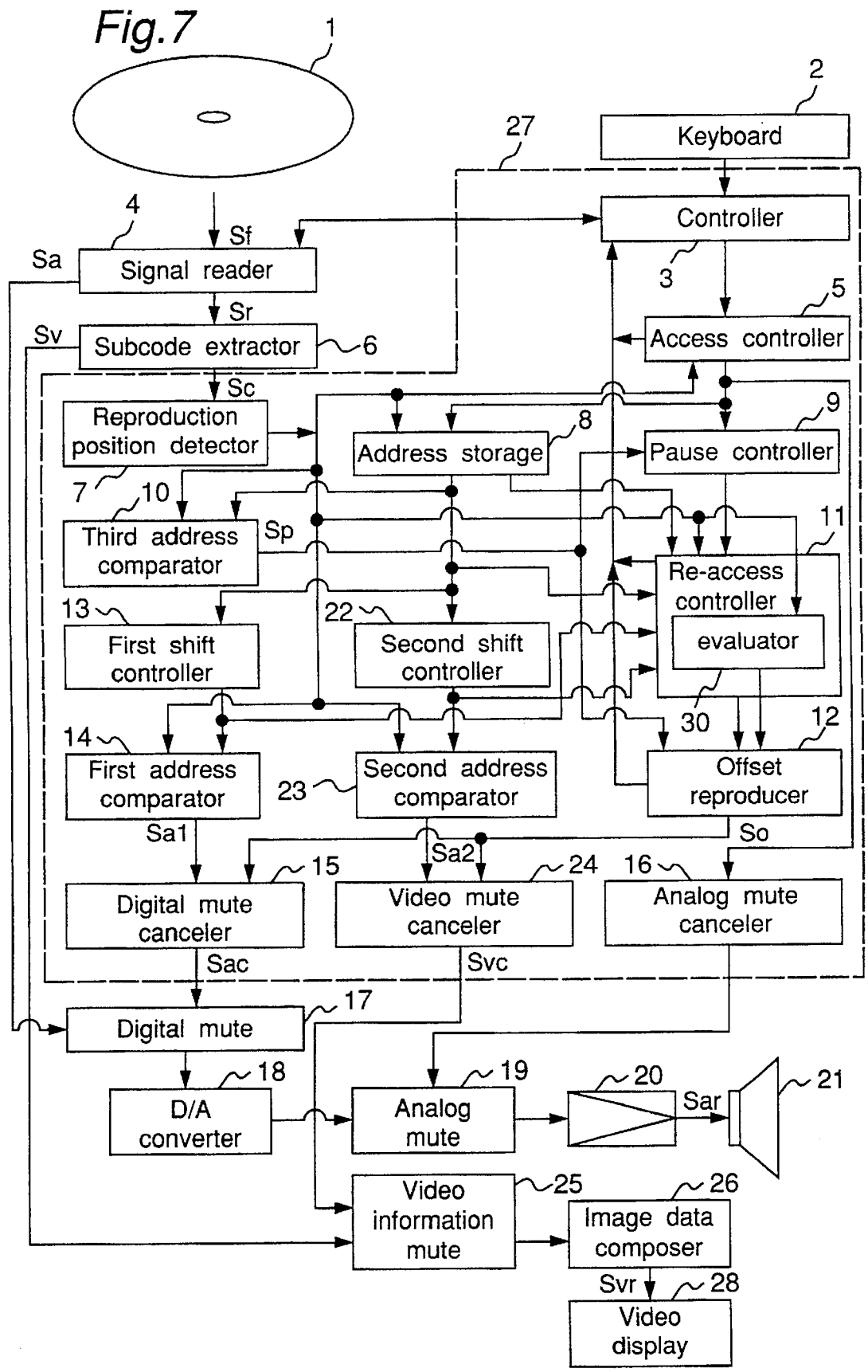
FIG. 7 is a block diagram of a digital signal reproducing apparatus according to a third embodiment of the present invention.

Referring to FIG. 7, another alternative of digital signal reproducing apparatus of FIG. 1 is shown. According to this embodiment, the re-access controller 11 in FIG. 1 further includes an evaluator 30 incorporated therein.

When operation by the pause controller 9 is completed, the evaluator 30 selects the position information identifying the first or earliest position on the disk with respect to the direction of reproduction from the first and second shift position information stored by the first and second shift controllers 13 and 22, respectively. The evaluator further determines the pickup of signal reader 4 is positioned before or after this earliest position. According to the determinations by the evaluator 30, the main controller 27 controls the operation of the apparatus. When it is determined that the signal reader 4 is positioned before this first position, the re-access controller 11 does not execute the re-access operation, the offset reproducer 12 does not offset the reproduction track, and the reproduction mode is assumed.

Figure 8:
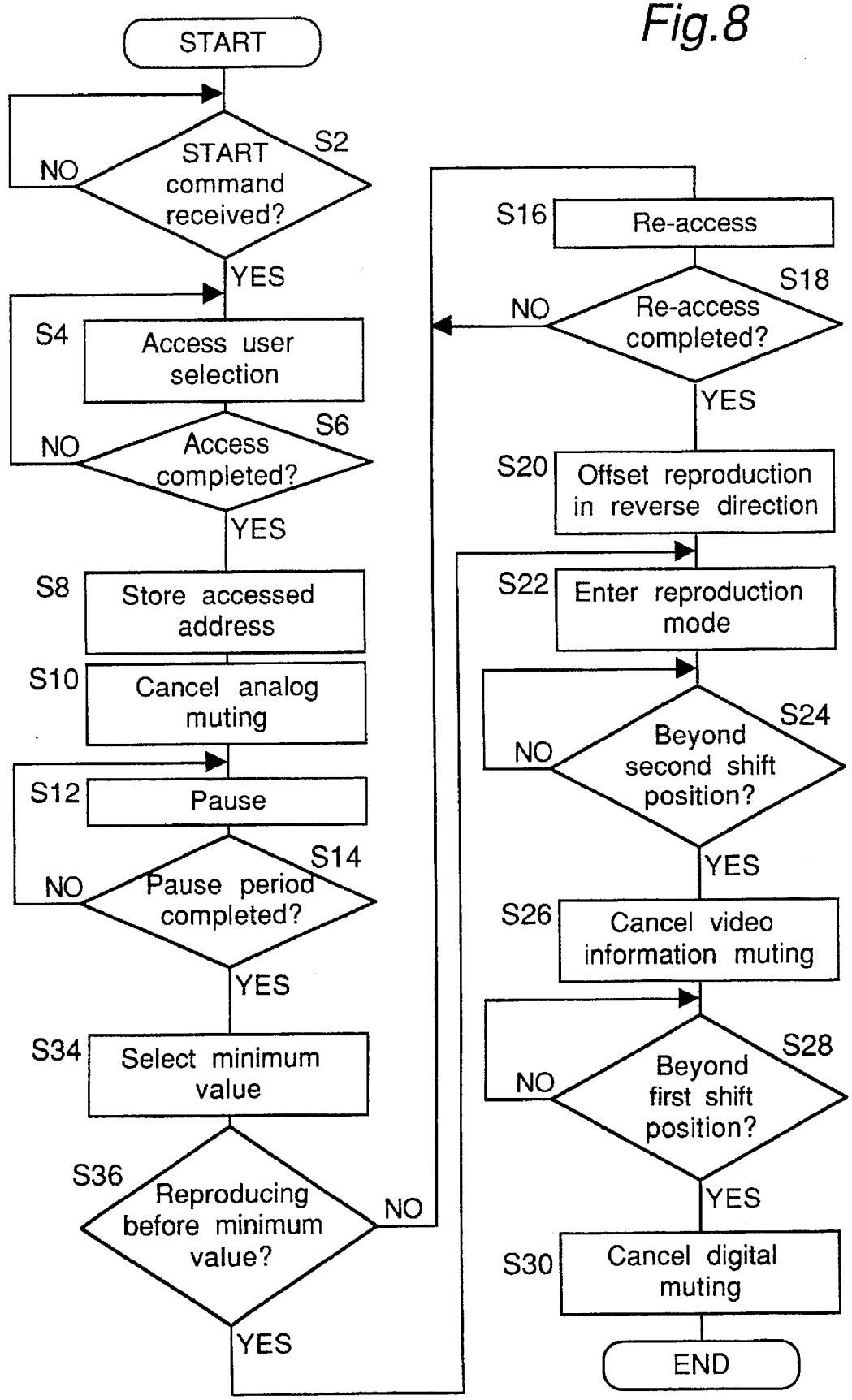
FIG. 8 is a flow chart showing the major steps in the processing operation executed by the digital signal reproducing apparatus of FIG. 7.

Referring to FIG. 8, a flow chart describing the major steps in the processing operation executed by the main controller 27 of the digital signal reproducing apparatus of FIG. 7 is shown. According to this embodiment, steps S34 and S36 are inserted between steps S14 and S16 of FIG. 2. As a result, the operation of this embodiment differs from that of FIG. 2 in the following points.

At step S14, a 500 msec. pause period is counted after the pause is initiated at step S12 to wait for muting by the analog mute 19 to be completely cancelled, as same as in the first embodiment (FIG. 2).

At step S34, the disk position at 4M59S71F preceding the initially accessed disk position at 5M00S00F by the delay time required for video information muting (four frames in this embodiment), and the disk position at 4M59S72F preceding the initially accessed disk position by the delay time required for digital (audio information) muting (three frames in this embodiment), are compared, and the disk position with the lowest value is selected. It is assumed below that the disk position at 4M59S71F is the lowest value, then the procedure advances to step S36.

At step 36, it is determined by reading the sub-code signal Sc from the disk 1 whether the current (reproduction) position of the disk 1 is before this lowest value position or not. The subcode signal can be read by the same operation used for reproduction: the pits on the disk 1 are read, and if the current position is known, it can be determined whether the 4M59S71F disk position will soon be reached or whether it has already been passed. If the 4M59S71F disk position was already passed, the video information muting and digital muting cancellation timing cannot be optimized, and control therefore skips to step 108 to re-access the disk (execute the re-access operation).

However, if a point before the 4M59S71F disk position is being reproduced, the timing point at which video information muting and digital muting cancellation timing can be optimized will be reached naturally as the signal reader 4 advances. The re-access operation is therefore skipped and reproduction tracing the pit path on the disk 1 is begun in step 41 without jumping the reproduction track. Operation after this point is the same as in the first embodiment described above, and further description is therefore omitted below.

Figure 9:
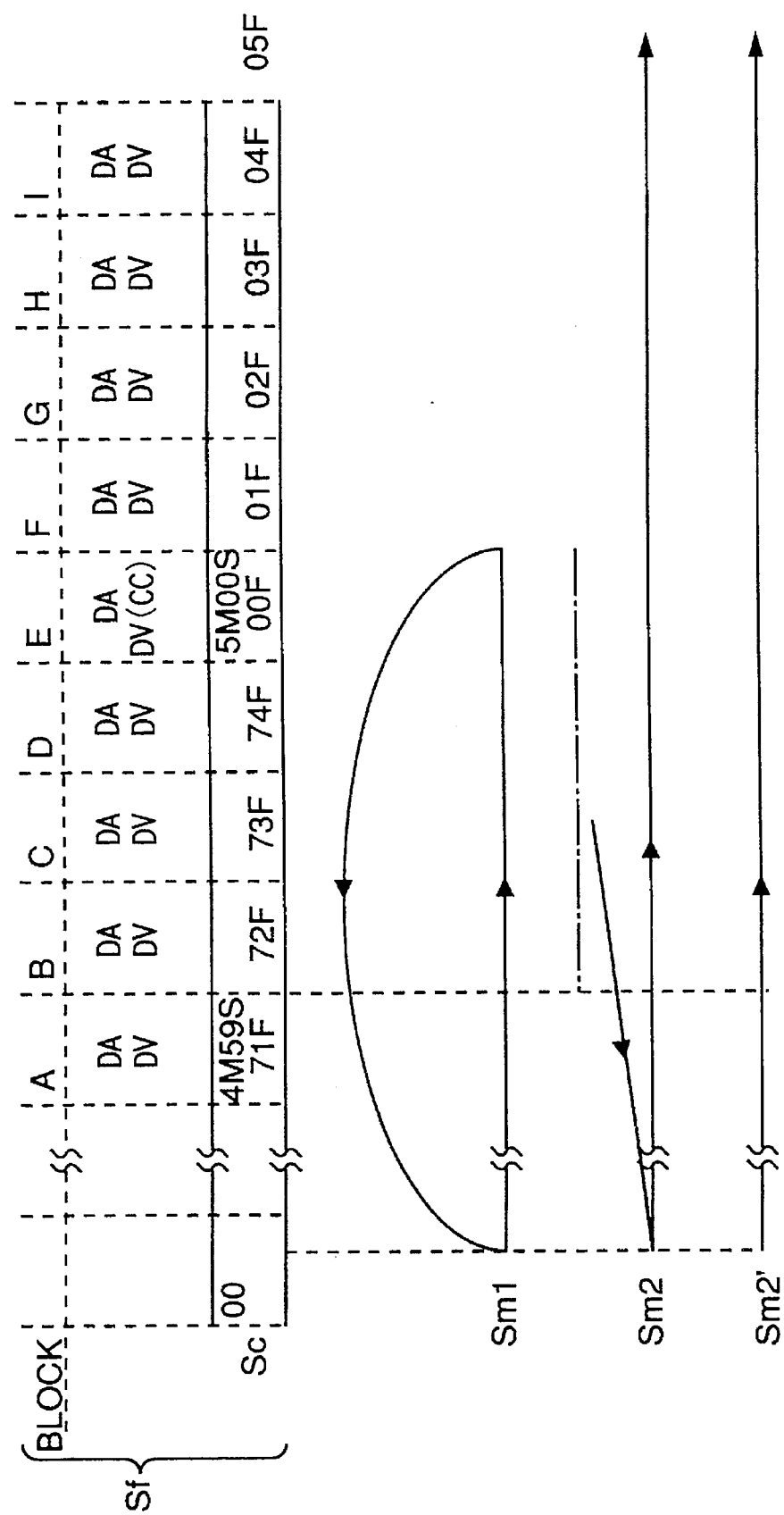
FIG. 9 is a timing chart used to describe the operation for reading information recorded to the disk by the digital signal reproducing apparatus of FIG. 7.

As a result of this control method, control pauses after accessing the disk 1 at 5M00S00F whereat TNO=2, as best shown in FIG. 9, and the disk 1 spins through the reproduction position at 5M00S00F repeatedly during the period after this predetermined pause ends and before the pause is cancelled. Reproduction can therefore be begun immediately from that position if the signal reader 4 is circumstantially positioned before the 4M59S71F disk position when the pause operation is cancelled. The main controller 27 can therefore begin the video muting cancellation operation at the point the block A corresponding to 4M59S71F is read, and cancels video information muting by the video information mute 25 at the beginning of block C. By detecting cancellation of video information muting, the image data composer 26 can begin generating the screen data using the video information from block E, i.e., using the video information from the recording start position at the track TNO=2, and the loss of video information will not be apparent on the video display 28.

Operation after this point is the same as in the first embodiment described above, and further description is therefore omitted below.

If the signal reader 4 is positioned before the required offset position (4M59S71F in this embodiment) when the pause applied by the pause controller 9 is cancelled, and the re-access controller 11 executes a re-access operation and the offset reproducer 12 offsets the reproduction track, the signal reading position of the signal reader 4 will be moved back farther than necessary, an excessive amount of time will be required for the next digital and video information muting cancellation operations, and the disk reproduction speed will drop.

Referring to FIG. 9, a timing chart similar to that of FIG. 3 used to describe the operation for reading information recorded to the disk 1 by the digital signal reproducing apparatus of FIG. 7 is shown. Note that the operation very similar to that of the first embodiment described with reference to FIG. 3 is shown in FIG. 9, therefore only the movements of pickup of signal reader 4 under the various situations are indicated by the lines Sm1, Sm2, and Sm2'.

The line Sm1 indicates the movement of pickup 4 during the pause period, wherein the pickup 4 repeatedly offset to the preceding frames and moves between the frames, as shown, until the pause period terminates. The lines Sm2 indicates the movement of pickup 4 after the pause period terminates while the pickup 4 is located between blocks B and C. The line Sm 2' indicates the movement of pickup 4 after pause period terminates while the pickup 4 is located between blocks A and B.

In this third embodiment of the invention, however, it is determined whether re-accessing the disk or offsetting the reproduction track is necessary based on the current position of the signal reader 4 when the pause is cancelled, and it is therefore possible to achieve a digital signal reproducing apparatus whereby the beginning of the video and audio information are not dropped even though the reproduction speed of the disk 1 is not reduced.

It is to be noted that the above embodiments of a digital signal reproducing apparatus according to the present invention address the problem of the timing for cancelling video muting and the timing for cancelling digital muting of the audio information at the start of reproduction. Just as it is possible to output video and audio at the beginning of reproduction as described above, it is also possible to naturally display a picture on the video display means when the user executes and then cancels a pause during reproduction from a CD-G disk by further adapting the present invention to a CD-G disk digital signal reproducing apparatus.

CD-G media are often used for applications such as karaoke whereby the user sings along to the audio recorded to the disk by displaying to the video display means the lyrics recorded as the video information while reproducing through speakers the sound track recorded as the audio information. In most karaoke media, the words that should be sung by the user at any given point during the song are indicated for the user by changing the color in the area of those words within the lyrics displayed in the video information on the video display means. In addition, this color change is not affected by letter unit, but by means of a continuous fade from left to right such that the color of each letter changes gradually from the left side to the right side until finally the color of the entire letter has changed from the original color.

As a result, if the user pauses reproduction while using a CD-G karaoke disk, the pause may be executed at a point where the color of only the left part of a letter has changed, i.e., if the original text color is white and the color of changed text is blue, the left side of the letter is blue and the right side is still white. When the user then cancels the pause and reproduction is resumed, the video information from the disk will be read into the image displayed on the video display means.

However, as described in the prior art above, a pause operation refers to an operating loop whereby tracking is adjusted when the signal reader 4 exceeds the 5M00S00F address to move to a point before the 5M00S00F address, and the subcode information is read again to reposition the signal reader 4 as necessary. As a result, the program for the processing operation when reproduction starts can be effectively used if when the pause is cancelled the disk reproduction position at which the pause was started is re-accessed before resuming reproduction.

Therefore, with a digital signal reproducing apparatus according to the prior art, it is not possible to achieve a "natural" video display on the video display means if the user pauses reproduction in the middle of a selection from a karaoke CD-G disk and then cancels the pause because of the problems described above relating to the timing for cancelling video information muting and digital muting of the audio information at the beginning of reproduction. With a conventional digital signal reproducing apparatus, the left part of a letter will be blue and the right part will be white when the user pauses reproduction of a selection from a karaoke CD-G disk. When the user then cancels the pause to resume reproduction, some of the video information passed to the image data composer will be lost, and an unnatural display wherein the left half of the letter is blue, the center part of the right half is white, and the right side edge is blue, may result.

When this same operation is executed with a digital signal reproducing apparatus according to the present invention, however, the timing for cancelling video information muting and the timing for cancelling digital (audio information) muting are optimized, and there is no video information lost when the video information from the disk is passed to the image data composer again after resuming reproduction. Text displayed in the video display means can therefore be displayed naturally with the left half blue and the right half white.

Furthermore, in the preferred embodiments of the invention the first and second shift means store the sum or difference of a constant value added to or subtracted from the disk reproduction position information stored by the address storage when access by the access controller is completed. It is alternatively possible, however, to not store these values, but rather to compare the value of the reproduction position obtained by adding or subtracting this constant value to or from the reproduction position information stored by the address storage with the value of the output from the reproduction position detector each time the comparing operations of the first address comparator and second address comparator are accomplished.

It should also be noted that while the timing for cancelling video information muting and the timing for cancelling audio muting differ in the above embodiments, it will be obvious that both of these operations can be executed at the same timing.

It should also be noted that while the present invention has been described with application to a digital signal reproducing apparatus for reproducing CD-G disks, it will be obvious that the invention can also be applied to digital signal reproducing apparatuses using other types of disk media, including video CDs storing digitally compressed moving picture video.

As described hereinabove, it is possible to prevent the first part the video information and the first part of the audio information recorded from the specified reproduction position from being lost and not output from the video display means or speaker even when the video and audio information start immediately from the data block corresponding to the specified reproduction position. This is made possible by offsetting the signal reading position of the signal reader in the reverse direction after completing access to the specified disk reproduction position, and cancelling video and audio information muting at independently controlled timing points. As a result, it is possible to achieve a digital signal reproducing apparatus for naturally reproducing the video and audio information recorded to the disk.

Furthermore, a digital signal reproducing apparatus for high speed processing of the disk reproduction operation whereby the beginning of the video and audio information are not lost can be achieved without moving the signal reading position farther than is necessary even when the disk is reproduced from the specified reproduction position because video muting or audio muting can be cancelled immediately after re-accessing the disk.

In addition, a digital signal reproducing apparatus according to the present invention can easily prevent the loss of video and audio information from the disk without greatly changing the basic hardware configuration of the digital signal reproducing apparatus by simply modifying or adding to the control software thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital signal reproducing apparatus for reproducing a first data and a second data stored in digital forms with a position data indicative of the locations said first and second data in plural recording areas sequentially formed in a recording medium, said apparatus comprising:

a reproducing means for reading said recording areas to reproduce said first, second, and position data;

a reproduction control means for controlling said reproducing means to read desirable areas of said recording areas;

a reproduction position detecting means for detecting a currently reproduced position of said recording areas based on said reproduced position data to produce a position signal;

a first muting means for muting said reproduced first data;

a second muting means for muting said reproduced second data;

an offset means for offsetting said reproducing means from a first position whereat said reproducing means completes the reading of said desirable areas based on said position signal;

a first shift means for determining a first shift position shifted from said first position based on said position signal to produce a first shift signal;

a first suppress means for suppressing the muting by said first muting means when said first shift position and said currently reproduced position match;

a second shift means for determining a second shift position sifted from said first position based on said position signal to produce a second shift signal;

a second suppress means for suppressing the muting by said second muting means when said second shift position and said currently reproduced position match;

a data conversion means for converting said reproduced first data to an analog signal;

a third muting means for muting said analog signal;

a third suppress means for suppressing the muting by said third muting means when said reproducing means completes the reading of said desirable areas based on said position signal;

a pause means for pausing for a predetermined period the reading operation of said reproducing means after said third suppress means suppresses the muting;

a re-access means for causing said reproducing means to read said desirable recording area when said predetermined period is passed; and an evaluation means for selecting, when said pause means completes the pausing operation, either one of said first and second shift signals whichever indicating a second position coming first in the reproduction direction, and for judging whether said currently reproduced position is before said first position or not; whereby only when said evaluation means judges that said currently reproduced position is at a point following said first position, said re-access means and said offset means perform.

2. A digital signal reproducing apparatus for reproducing a first data and a second data stored in digital forms with a position data indicative of the locations said first and second data in plural recording areas sequentially formed in a recording medium, said apparatus comprising:

a reproducing means for reading said recording areas to reproduce said first, second, and position data;

a reproduction control means for controlling said reproducing means to read desirable areas of said recording areas;

a reproduction position detecting means for detecting a currently reproduced position of said recording areas based on said reproduced position data to produce a position signal;

a first muting means for muting said reproduced first data;

a second muting means for muting said reproduced second data;

a first shift means for determining a first shift position shifted from said first position based on said position signal to produce a first shift signal;

a second shift means for determining a second shift position sifted from said first position based on said position signal to produce a second shift signal;

a re-access means for selecting either one of said first and second shift signals whichever indicating a second position coming first in the reproduction to cause said reproducing means to read recording area indicated by said second position;

a first suppress means for suppressing the muting by said first muting means when said first shift position and said currently reproduced position match; and a second suppress means for suppressing the muting by said second muting means when said second shift position and said currently reproduced position match.

3. A disk reproducing apparatus comprising:

a signal reading means for reading the digital signals recorded to a disk-shaped recording medium;

a subcode extractor for extracting and outputting the subcode information from the digital signal;

a reproduction position selector for specifying the position on the disk to be reproduced;

an access means for causing the signal reading means to access the specified reproduction position on disk;

a reproduction position detector for outputting the sub-code information corresponding to the signal reading position of the signal reading means as the reproduction position information;

an audio muting means for muting the audio information in the output signal of the signal reading means;

a video muting means for muting the video information in the output signal of the signal reading means;

a track offset means for reversing the signal reading position of the signal reading means from the completed access position of the access means;

a first shift means for adding or subtracting a constant value to or from the access position information output by the reproduction position detector at the point access by said access means is completed, and outputting the resulting first shift position information;

a first address comparator for comparing the first shift position information with the reproduction position information output from the reproduction position detector;

an audio muting cancellation means for cancelling audio muting by the audio muting means when the first address comparator determines the first shift position information and the reproduction position information match;

a second shift means for adding or subtracting a constant value to or from the access position information output by the reproduction position detector at the point access by said access means is completed, and outputting the resulting second shift position information;

a second address comparator for comparing the second shift position information with the reproduction position information output from the reproduction position detector; and a video muting cancellation means for cancelling video muting by the video muting means when the second address comparator determines the second shift position information and the reproduction position information match.

* * * * *